United States Patent
Lemmers, Jr. et al.

(10) Patent No.: US 7,821,171 B2
(45) Date of Patent: Oct. 26, 2010

(54) GENERATOR WEDGE WITH REDUCED EDDY CURRENT LOSSES

(75) Inventors: Glenn C. Lemmers, Jr., Loves Park, IL (US); Laurence D. Vanek, Janesville, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 12/326,321

(22) Filed: Dec. 2, 2008

(65) Prior Publication Data
US 2010/0133946 A1 Jun. 3, 2010

(51) Int. Cl.
*H02K 3/48* (2006.01)
*H02K 3/487* (2006.01)

(52) U.S. Cl. ............. 310/214; 310/260; 242/433.3

(58) Field of Classification Search .......... 310/214, 310/260; 242/433.3
See application file for complete search history.

(56) References Cited

U.S. PATENT DOCUMENTS

| | | | |
|---|---|---|---|
| 3,596,120 A * | 7/1971 | Potter ................... 310/41 |
| 4,356,419 A * | 10/1982 | Boer et al. .......... 310/216.017 |
| 4,443,725 A * | 4/1984 | Derderian et al. ......... 310/214 |
| 4,982,123 A | 1/1991 | Raad |
| 5,027,500 A | 7/1991 | Kecke |
| 5,430,340 A | 7/1995 | Shih |
| 6,327,762 B2 | 12/2001 | Kelleher |
| 6,331,745 B2 | 12/2001 | Blakelock |
| 6,465,928 B1 | 10/2002 | Shervington |
| 6,634,836 B2 | 10/2003 | Nolan |
| 6,683,398 B2 | 1/2004 | Tong |
| 6,759,771 B2 * | 7/2004 | Doherty et al. ............ 310/58 |
| 6,791,230 B2 * | 9/2004 | Tornquist et al. .......... 310/214 |
| 6,838,778 B1 | 1/2005 | Kandil |
| 6,882,079 B2 | 4/2005 | Kilpatrick |
| 6,979,929 B2 * | 12/2005 | Tornquist et al. .......... 310/214 |
| 7,119,644 B2 * | 10/2006 | Snitchler et al. .......... 335/216 |
| 7,262,537 B2 | 8/2007 | Worley |
| 2004/0232795 A1 * | 11/2004 | Tornquist et al. .......... 310/214 |
| 2004/0263019 A1 * | 12/2004 | Buchan et al. ............ 310/214 |

* cited by examiner

*Primary Examiner*—Quyen Leung
*Assistant Examiner*—Terrance Kenerly
(74) *Attorney, Agent, or Firm*—Carlson, Gaskey & Olds

(57) ABSTRACT

A wedge placed between adjacent coils in a generator comprises a wedge body having a generally triangular portion to be positioned at a radially inner location, and a radially outer portion. The radially outer portion includes ends that will be spaced at axial ends of the wedge when the wedge is positioned within a generator. The ends have a first surface spaced a first distance from an apex of the triangle. The end walls extend above the first surface at each of two spaced positions axially inwardly of the ends of the wedge. The end walls are connected to side walls that extend near circumferential edges of the wedge. An open pocket is formed within the wedge body at locations between the side walls and axially between the end walls.

15 Claims, 2 Drawing Sheets

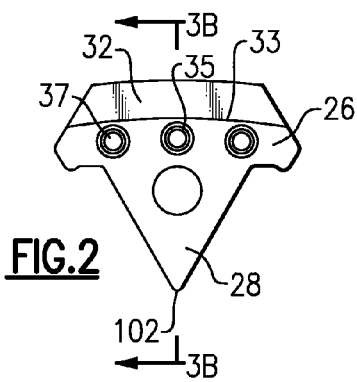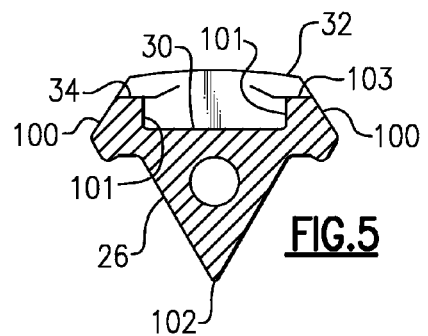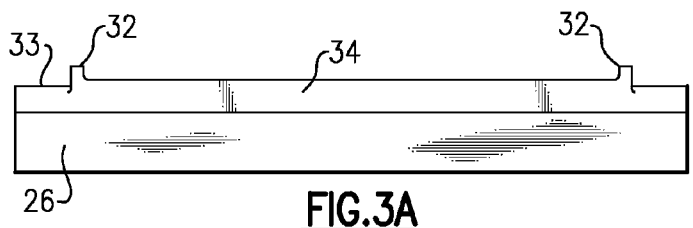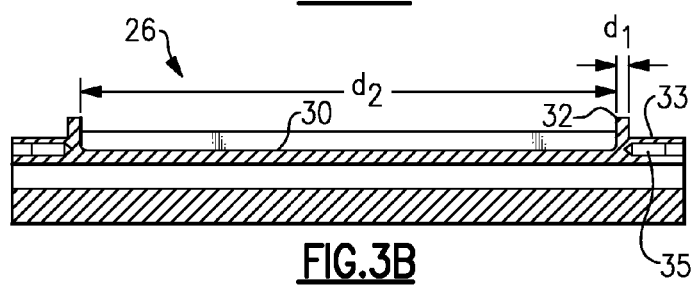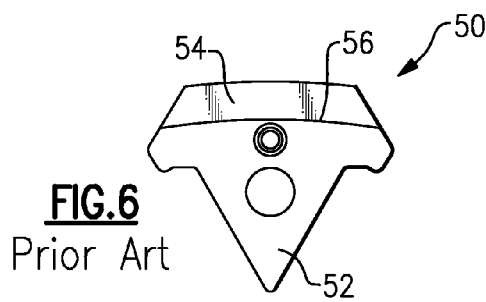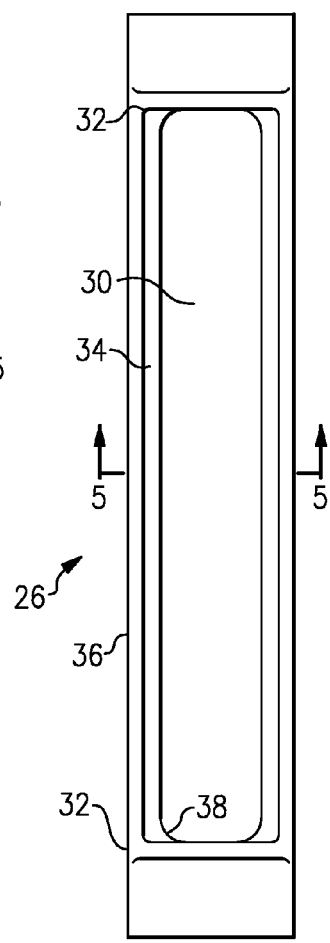

GENERATOR WEDGE WITH REDUCED EDDY CURRENT LOSSES

BACKGROUND OF THE INVENTION

This application relates to a wedge to be positioned between coils in an electrical generator.

Electrical generators typically include a shaft that is driven for rotation, and which carries a plurality of field coils. Typically, wedges are positioned between the field coils.

A prior art wedge 50 is illustrated in FIGS. 6 and 7. As can be seen, the wedge 50 includes a triangular lower portion 52, which is to be positioned between coils, and a surface 56, which sits within containment bands of the generator, and a raised portion 54. The prior art wedge as shown in FIGS. 6 and 7 generates a relatively high degree of eddy current losses, and thus reduces generator efficiency.

SUMMARY OF THE INVENTION

A wedge placed between adjacent coils in a generator comprises a wedge body having a generally triangular portion to be positioned at a radially inner location, and a radially outer portion. The radially outer portion includes ends that will be spaced at axial ends of the wedge when the wedge is positioned within a generator. The ends have a first surface spaced a first distance from an apex of the triangular portion. End walls extend from the first surface at each of two positions spaced axially inwardly of the ends of the wedge. The end walls are connected to side walls that extend near circumferential edges of the wedge. An open pocket is formed within the wedge body at locations between the side walls and axially between the end walls.

These and other features of the present invention can be best understood from the following specification and drawings, the following of which is a brief description.

BRIEF DESCRIPTION OF THE DRAWINGS

FIG. 2 shows a front view of an inventive wedge.
FIG. 3A is a side view of the FIG. 2 wedge.
FIG. 3B is a cross-section along line 3B-3B of FIG. 2.
FIG. 4 is a top plan view of the wedge.
FIG. 5 is a cross-sectional view along line 5-5 as shown in FIG. 4.
FIG. 6 shows a prior art wedge.
FIG. 7 is a side view of the prior art wedge.

DETAILED DESCRIPTION OF THE PREFERRED EMBODIMENT

Figure 1:
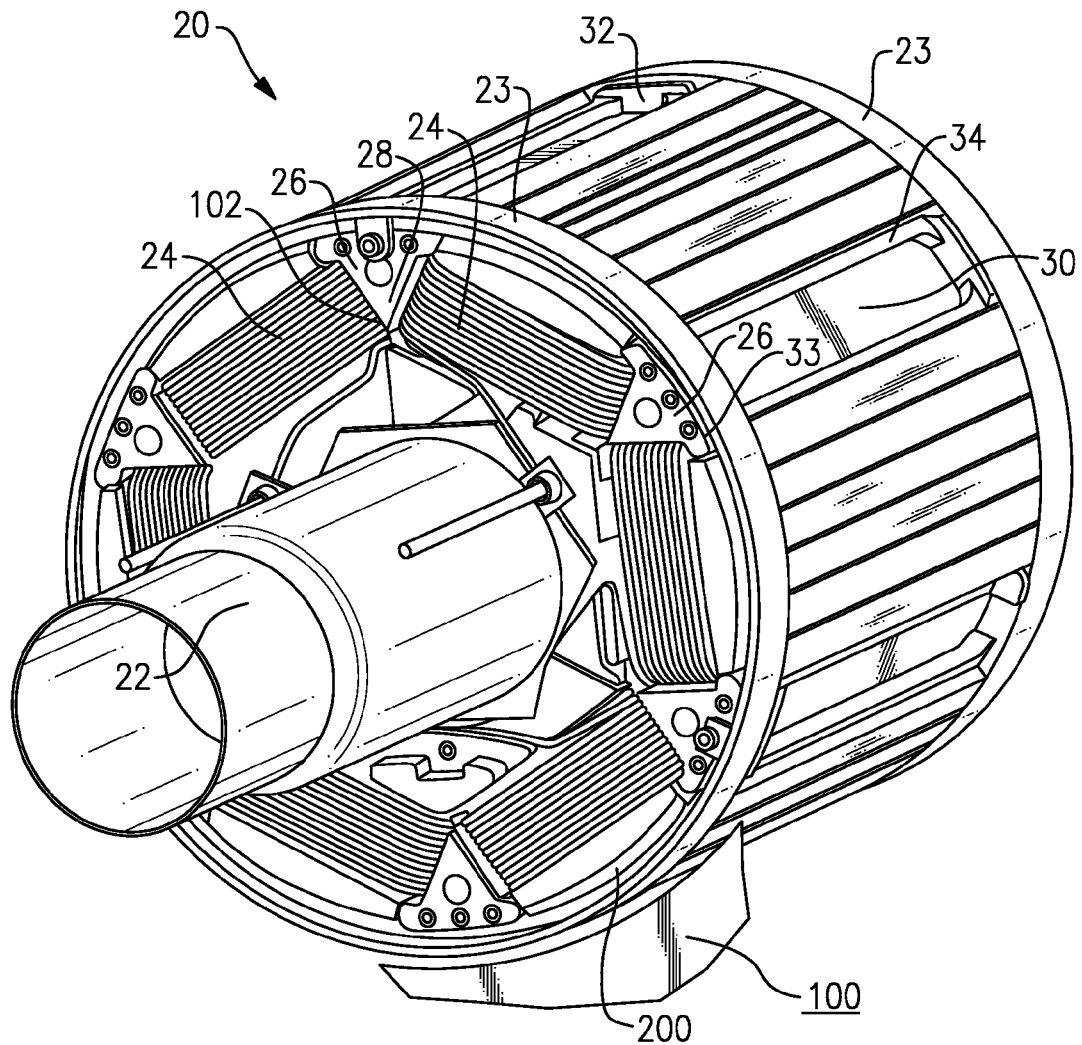
FIG. 1 shows an assembled generator.

A generator 20 is illustrated in FIG. 1. Generator 20 includes a rotating shaft 22, which is driven for rotation by some drive, such as an engine. The shaft 22 carries coils 24 which rotate adjacent to a stator 100, shown schematically, to generate electricity. End turn supports 200 receive the coils 24. Wedges 26 having a triangular lower portion 28 are positioned circumferentially between the coils 24. An apex 102 of the triangular lower portion 28 can be used as a point of reference for the remainder of the structure.

As can be appreciated from FIG. 1, wedges 26 are formed of a body provided with end walls 32. Surfaces 33 are radially smaller than end wall 32, and sit within the containment bands 23 23. This feature was also true of the prior art of FIGS. 6 and 7.

The wedge 26 differs from the FIGS. 6 and 7 prior art wedge by having a pocket or cut-out 30. In addition, side walls 34 connect end walls 32, but do not extend radially as high as the end walls 32.

FIG. 2 shows the wedge 26 having the triangular lower portion 28. An end wall 32 extends above surface 33. Holes 37 and 35 receive bolts or pins to balance the generator.

FIG. 3A is a side view of the wedge 26, showing the side walls 34 do not extend as far above the surfaces 33 as do the end walls 32. For purposes of comparison, the distances can be measured from apex 102.

As shown in FIG. 3B, the pocket 30 extends for the majority of a length of the wedge 26. In one embodiment, an axial length of each end wall 32 is 0.715, while the pocket 30 extends for 4.365. For best results, the ratio of the length of the pocket $d_2$ to length $d_1$ of each end wall is between 5 and 7, including the end points.

As can also be seen, holes 35 extend into the wedge 26 from the ends.

FIG. 4 is a top view of the wedge 26. As can be seen, the edges 38 of side walls 34 curve into the end walls 32.

As can be appreciated from FIG. 5, the side walls 34 do not extend as high as the end walls 32. In one embodiment, the height of the side walls 34 above the surface of pocket 30 is 0.174 and the height of the end walls 32 is 0.307. For best results, the ratio of the height of the side wall above the surface of the pocket compared to the height of the end walls above the surface of the pocket is between 0.4 and 0.7, including the end points.

As can also be appreciated from FIG. 5, outer faces 100 of the side walls 34 extend at an angle relative to a central plane (e.g., along line 3B-3B of FIG. 2) of the wedge 26, such that they approach each other. However, as is clear, they end at a flat top wall 103. At the same time, inner faces 101 of the side walls 34 extend along generally parallel planes relative to each other. The top surfaces 103 are generally perpendicular to the planes of the inner faces 101 of the side wall.

Another feature which can be appreciated by comparing FIGS. 2 and 5 is that the surface 33, and the top of the end walls 32, are each curved about a radius of curvature which is spaced from a body forming the wedge 26. On the other hand, the top surface 103 of the side walls 34, and the surface of the pocket 30, are generally flat, not curved, and generally parallel to each other.

It has been found that forming the pocket within the wedge 26 has the result of dramatically reducing eddy current losses. This in turn improves generator efficiency.

In one embodiment, the wedges were formed of a suitable aluminum. In particular, ASTMB221, or AMS4339 may be utilized.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A wedge for being placed between adjacent coils in a generator comprising:
a wedge body having a generally triangular portion to be positioned at a radially inner location, and a radially outer portion, said radially outer portion including ends that will be spaced at axial ends of said wedge when said wedge is positioned within a generator, said ends having a first surface spaced a first distance from an apex of said triangular portion, and end walls extending from said first surface at each of two positions spaced axially inwardly of said ends of said wedge body, said end walls being connected to side walls extending near edges of said wedge;

an open pocket formed within said wedge body at locations between said side walls and axially between said end walls; and said end walls extend to a second distance from said apex of said triangle, and said side walls extend for a third distance, said third distance between intermediate said first and second distances.

2. A wedge for being placed between adjacent coils in a generator comprising:

a wedge body having a generally triangular portion to be positioned at a radially inner location, and a radially outer portion, said radially outer portion including ends that will be spaced at axial ends of said wedge when said wedge is positioned within a generator, said ends having a first surface spaced a first distance from an apex of said triangular portion, and end walls extending from said first surface at each of two positions spaced axially inwardly of said ends of said wedge body, said end walls being connected to side walls extending near edges of said wedge; and an open pocket formed within said wedge body at locations between said side walls and axially between said end walls; and outer faces of said side walls being ramped at an angle toward each other, and inner faces of said side walls being generally parallel to each other.

3. The wedge as set forth in claim 1, wherein said side walls are rounded at a location where they merge into said end walls.

4. The wedge as set forth in claim 2, wherein said end walls extend to a second distance from said apex of said triangle, and said side walls extend for a third distance, said third distance between intermediate said first and second distances.

5. The wedge as set forth in claim 1, wherein a ratio of an axial length of said pocket to an axial length of each of said end walls is between 5 and 7, including the end points.

6. The wedge as set forth in claim 1, wherein a ratio of a height of said side walls above a nominal surface of said pocket relative to a height of said end walls above said nominal surface of said pocket is between 0.4 and 0.7, including the end points.

7. The wedge as set forth in claim 1, wherein said first surface, and an outer surface of said end walls being curved about radii of curvature spaced from said wedge body, and an outer surface of said end walls, and said pocket are not curved, and are generally parallel to each other.

8. A wedge for being placed between adjacent coils in a generator comprising:

a wedge body having a generally triangular portion to be positioned at a radially inner location, and a radially outer portion, said radially outer portion including ends that will be spaced at axial ends of said wedge when said wedge is positioned within a generator, said ends having a first surface spaced a first distance from an apex of said triangular portion, and end walls extending from said first surface at each of two positions spaced axially inwardly of said ends of said wedge body, said end walls being connected to side walls extending near circumferential edges of said wedge;

an open pocket formed within said wedge body at locations between said side walls and axially between said axial end walls, wherein a ratio of an axial length of said pocket to an axial length of each of said end walls is between 5 and 7, including the end points;

said end walls extending to a second distance from said apex of said triangle, and said side walls extending for a third distance, said third distance between intermediate said first and second distances, a ratio of a height of said side walls above a nominal surface of said pocket relative to a height of said end walls above said nominal surface of said pocket is between 0.4 and 0.7, including the end points;

said side walls being rounded at a location where they merge into said end walls;

outer faces of said side walls being ramped at an angle toward each other, inner faces of said side walls being generally parallel to each other; and said first surface, and an outer surface of said end walls being curved about radii of curvature spaced from said wedge body, and an outer surface of said end walls, and said pocket not being curved, and being generally parallel to each other.

9. A generator comprising:

a stator;

a rotary shaft to be driven to rotate about an axis within said stator and having a plurality of field coils positioned circumferentially spaced around an axis of rotation of said rotary shaft; and a plurality of wedges placed between adjacent coils in a generator, each wedge having a wedge body with a generally triangular portion positioned at a radially inner location, and a radially outer portion, said radially outer portion including ends spaced at axial ends of said wedge, said ends having a first surface spaced a first distance from an apex of said triangular portion, and end walls extending from said first surface at each of two positions spaced axially inwardly of said ends of said wedge body, said end walls being connected to side walls extending near edges of said wedge, and an open pocket formed within said wedge body at locations between said side walls and axially between said end walls.

10. The generator as set forth in claim 9, wherein said end walls extend to a second distance from said apex of said triangle, and said side walls extend for a third distance, said third distance between intermediate said first and second distances.

11. The generator as set forth in claim 9, wherein said side walls are rounded at a location where they merge into said end walls.

12. The generator as set forth in claim 9, wherein outer faces of said side walls are ramped at an angle toward each other and inner faces of said side walls are generally parallel to each other.

13. The generator as set forth in claim 9, wherein a ratio of an axial length of said pocket to an axial length of each of said end walls is between 5 and 7, including the end points.

14. The generator as set forth in claim 9, wherein a ratio of a height of said side walls above a nominal surface of said pocket relative to a height of said end walls above said nominal surface of said pocket is between .4 and .7, including the end points.

15. The generator as set forth in claim 9, wherein said first surface, and an outer surface of said end walls being curved about radii of curvature spaced from said wedge body, and an outer surface of said end walls, and said pocket, are not curved, and are generally parallel to each other.

* * * * *